United States Patent [19]

Sato

[11] Patent Number: 5,067,934
[45] Date of Patent: Nov. 26, 1991

[54] DIFFERENTIAL GEAR MECHANISM
[75] Inventor: Kazuhiko Sato, Konan, Japan
[73] Assignee: Diesel Kiki Co., Ltd., Tokyo, Japan
[21] Appl. No.: 497,713
[22] Filed: Mar. 23, 1990
[30] Foreign Application Priority Data Mar. 27, 1989 [JP] Japan .................. 1-34418[U]

[51] Int. Cl.⁵ .................. F16H 1/445; F16H 1/36
[52] U.S. Cl. .................. 475/227; 475/226; 475/333
[58] Field of Search ........... 475/226, 227, 231, 237, 475/333

[56] References Cited

U.S. PATENT DOCUMENTS

| | | | |
|---|---|---|---|
| 1,170,561 | 2/1915 | Le Roy et al. | 475/237 |
| 1,252,388 | 1/1918 | Bickley | 475/226 X |
| 1,262,833 | 4/1918 | Nogrady | 475/226 |
| 1,284,401 | 11/1918 | Mahler | 475/237 X |
| 1,407,703 | 2/1922 | Moir | 475/226 X |
| 1,511,908 | 10/1924 | Pickering | 475/237 |
| 2,272,161 | 2/1942 | Frederickson | 475/226 |
| 2,638,797 | 5/1953 | Gross | 475/237 |
| 3,884,096 | 5/1975 | Gleasman | 475/227 |
| 4,805,487 | 2/1989 | Pedersen | 475/226 |
| 4,926,711 | 5/1990 | Arakawa | 475/227 |

FOREIGN PATENT DOCUMENTS

| | | | |
|---|---|---|---|
| 0536950 | 2/1959 | Belgium | 475/237 |
| 2334043 | 1/1974 | Fed. Rep. of Germany . | |
| 989892 | 7/1975 | Italy . | |
| 0901093 | 2/1982 | U.S.S.R. | 475/237 |
| 0558504 | 1/1944 | United Kingdom | 475/237 |
| 1429359 | 3/1976 | United Kingdom . | |
| 8903942 | 5/1989 | World Int. Prop. O. | 475/227 |

Primary Examiner—Richard Lorence
Assistant Examiner—David E. Henn

[57] ABSTRACT

A differential gear mechanism has a clutch between a pair of worm gears which are each connected to different axle shafts. The clutch connects and disconnects the worm gears. When the worm gears are connected, differential operation is locked. Because of this, even if any one of the axle shafts enters a complete kidding state, drive torque is transmitted to the other axle shaft. When the connected state of the worm gears is released, an ordinary differential operation is performed.

6 Claims, 3 Drawing Sheets

DIFFERENTIAL GEAR MECHANISM

BACKGROUND OF THE INVENTION

The present invention relates to a differential gear mechanism.

An example of prior art relevant to the present invention has been shown in U.S. Pat. No. 3,884,096, British Pat. No. 1,429,359, Italian Pat. No. 989,892 or West German Patent Laid Open Publication No. 2,334,043. In these prior art references, a differential case is provided which is driven from the outside and which rotates a pair of worm gears which are provided in the differential case and are each connected to different axle shafts, and a plurality of element gears which are composed of a worm wheel and spur gears are provided on both sides of the worm wheel. The worm gears are arranged coaxially and are each rotatable independently. The element gears are arranged in one set of two elements gears and a plurality of sets are provided around the worm gears. These element gears are supported by the differential case and are rotatable. For each pair of element gears, their spur gears engage with each other and their worm wheels engage with each of the worm gears.

The above-described differential gear mechanism compensates for a rotation difference between two axle shafts such as a conventional differential gear mechanism, and what is more, distributes a large drive torque to an axle shaft with slower rotation by automatically varying a distribution of torques to the axle shafts. That is, the differential gear mechanism transmits larger torque to an accelerator shaft with larger resistance than that of the other accelerator shaft with smaller resistance, according to certain torque bias ratio which is decided by a lead angle of the worm gears and the friction state during driving of the worm gears.

However, in such differential gear mechanism, when one wheel is disengaged and causes skidding to make resistance to one axle shaft zero, torque is not transmitted to the other axle shaft. Because of this, there was a problem that a vehicle could not get out of the skidding state unaided.

SUMMARY OF THE INVENTION

It is an object, therefore, of the present invention to overcome the disadvantages and limitations of the prior art by providing a new and improved differential gear mechanism.

Another object of the present invention is to provide a differential gear mechanism equipped with a lock function.

The above objects are attained by a differential gear mechanism comprising; a rotatable differential case which is driven from the outside; a pair of worm gears provided in said differential case and each connected to different axle shafts, said worm gears being arranged coaxially and being rotatable independently; a plurality of element gears composed of a worm wheel and spur gears provided on both sides of said worm wheel, one or more sets of said element gears being provided, around said worm gears, and in a set of element gears, their spur gears being engaged with each other and their worm wheels being engaged with each of said worm gears and supported rotatably by said differential case; and clutch means provided between said worm gears for bringing the worm gears into a connected state and for releasing the connected state.

In such a construction, when the worm gears are connected by the clutch means, the differential gear mechanism is placed in the lock state, by which, even if one of the axle shafts is in a skidding state, drive torque is transmitted to the other of the axle shafts. Accordingly, it is possible to get out of the skidding state unaided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing objects, features and attendant advantages of the present invention will be appreciated as the same becomes better understood by means of the following description and accompanying drawings which are given by way of illustration only, and thus are not limitative of the present invention, and wherein.

DETAILED DESCRIPTION OF THE INVENTION

Figure 1:
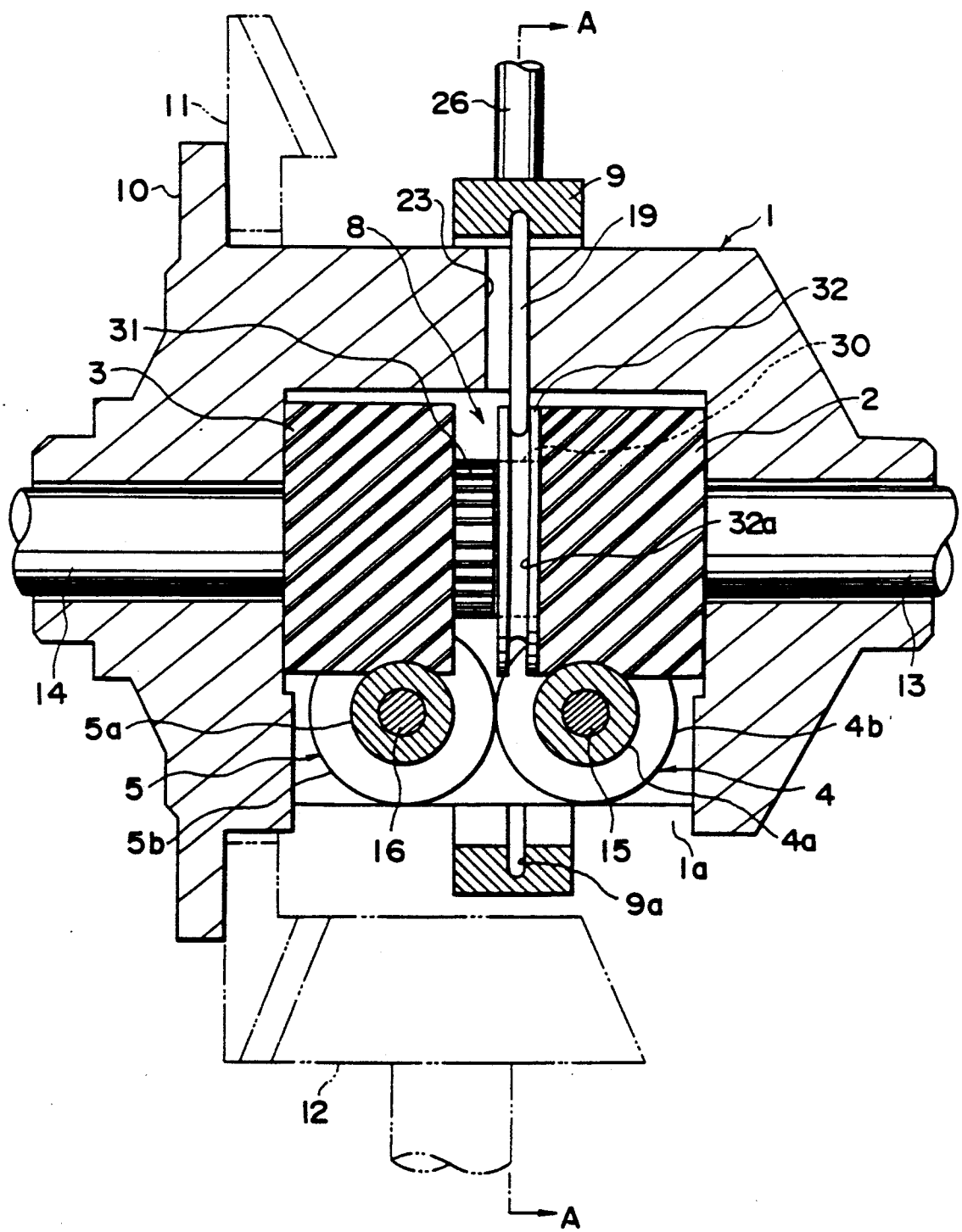
FIG. 1 is a cross sectional side view showing the construction of an, embodiment of the differential gear mechanism according to the present invention.
Figure 2:
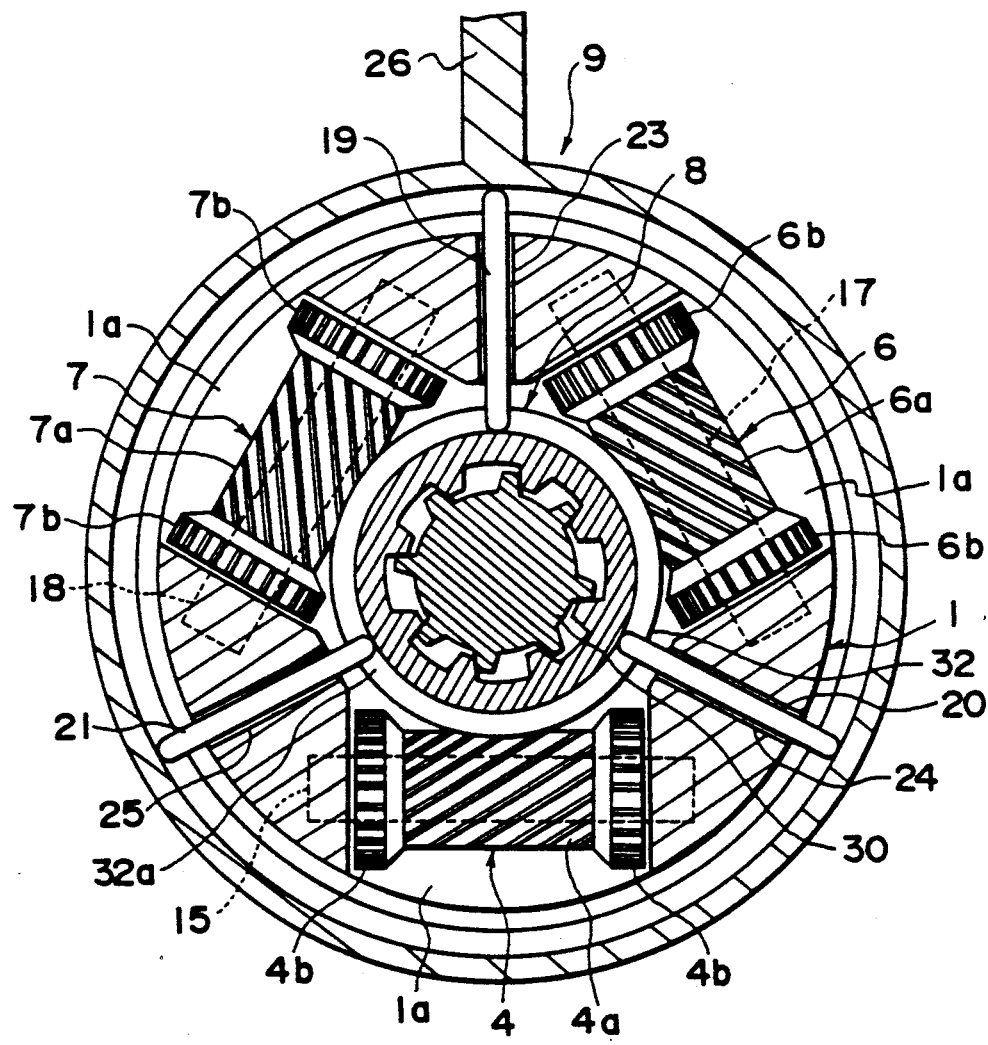
FIG. 2 is a sectional view taken along line A—A of FIG. 1.

In FIG. 1 and FIG. 2, reference numeral 1 is a differential case, reference numerals 2 and 3 are worm gears, reference numerals 4, 5, 6 and 7 are element gears, reference numeral 8 is a dog clutch, and reference numeral 9 is a ring member.

The differential case 1 has three openings 1a for attaching elements gears, which are formed with a 120° spacing against the center axis, and provides a flange 10 at the outside circumferential face thereof. A ring gear 11 is fixed to the flange 10. The differential case 1 is driven externally to rotate by engagement of the ring gear 11 and a drive pinion 12.

The worm gears 2 and 3 are arranged coaxially within the differential case and are rotatable independently. The worm gears 2 and 3 are connected respectively to axle shafts 13 and 14 by spline connection, and the axle shafts 13 and 14 rotate by rotation of these worm gears 2 and 3.

The element gears 4 through 7 have worm wheels 4a, 5a, 6a and 7a, and spur gears 4b, 5b, 6b and 7b each provided on both sides of the worm wheels 4a through 7a. The element gears 4 through 7 are arranged in one set of two element gears and three sets are allocated with a 120° spacing around the worm gears 2 and 3. The element gears 4 through 7 are attached rotatably to the openings 1a of the differential case 1 with journal pins 15, 16, 17 and 18. In the present embodiment, the elements gears 4 and 5 are arranged in a pair, and the element gears 6 and 7 are each arranged in a pair with an element gear which is not illustrated. For the elements gears 4 and 5, the spur gears 4b and 5b engage with each other, the worm wheel 4a of the element gear 4 engages with one worm gear 2, and the worm wheel 5a of the element gear 5 engages with the other worm gear 3. The same construction also applies to the other pairs of element gears.

The dog clutch 8 is provided between the worm gears 2 and 3. The dog clutch 8 has a first gear wheel 30, a second gear wheel 31 and a clutch ring 32. The first and second gear wheels 30 and 31 are provided coaxially with the worm gears 2 and 3. The first gear wheel 30 is provided on one worm gear 2, and rotates with the worm gear 2. The second gear wheel 31 is provided on the other worm gear 3, and rotates with the worm gear 3. The clutch ring 32 has internal gears which are engageable with the gear wheels 30 and 31 in the inside circumferential face, and is provided to be movable in the axial direction of worm gears 2 and 3. In the state shown in FIG. 1, the clutch ring 32 is engaged with the first gear wheel 30 only and rotates together with one worm gear 2. In this state, an ordinary differential action is performed. The clutch ring 32 can be moved towards the other worm gear 3, and can engage with both the first gear wheel 30 and the second gear wheel 31. By the clutch ring 32 engaging with both gear wheels 30 and 31, the worm gears 2 and 3 are connected. In this state, differential action is locked.

The clutch ring 32 provides a ring groove 32a on the outside circumferential face. Lever members 19, 20 and 21 are fitted in the ring groove 32a of the clutch ring 32 to allow movement between the lever members 19 through 21 and the clutch ring 32. The clutch ring 32 moves together with the lever members 19 through 21 moving in the axial direction of worm gears 2 and 3. By this movement, the worm gears 2 and 3 are connected, or their connection is released. The lever members 19 through 21 are provided to be movable towards the axial direction of worm gears 2 and 3 in through holes 23, 24 and 25 of the differential case 1 which are formed among the openings 1a, and rotate with the differential case 1. The lever members 19 through 21 have one of their ends fitted in the ring 32a of the dog clutch 8, as described above, and their other ends protrude from the outside circumferential face of the differential case 1 and are engaged with the ring member 9.

The ring member 9 is provided on the outside circumferential face of the differential case 1, and retained within an outer case (not illustrated) to be movable in the axial direction of worm gears 2 and 3. The ring member 9 provides a ring groove 9a in the inside circumferential face. The other ends of the lever members 19 through 21 are fitted in the ring groove 9a of the ring member 9 to allow reciprocation between the lever members 19 through 21 and the ring member 9. The ring member 9 provides an operation lever 26 on the outside circumferential face. By operation of the lever 26, the ring member 9 is moved, and the clutch ring 32 of the dog clutch is moved via the lever members 19 through 21. By this, the worm gears 2 and 3 are connected, or their connection is released. The operation lever 26 is operated by an actuator or the like. Incidentally, the ring member 9 does not rotate.

During the normal travel motion, the clutch ring 32 of the dog clutch 8 is maintained in engagement only with the first gear wheel 30 of the clutch ring 32. As the worm gears 2 and 3 are each rotated independently in this condition, normal differential operation is performed. Incidentally, even when a rotational difference between one worm gear 2 and the differential case 1 is generated during a differential operation, no problem occurs with the differential operation, because slippage occurs between the lever members 19 through 21 and the ring groove 32a of the dog clutch 8. On the other hand, when one axle shaft 14 begins to skid because of disengagement of a wheel or extreme muddy ground, for example, and resistance to the axle shaft 14 is reduced to zero, the operation lever 26 is operated to connect the worm gears 2 and 3 by means of the dog clutch 8. Because the differential operation is then locked, drive torque is transmitted to the other axle shaft 13 even when the axle shaft 14 is in the complete skidding state. Thus, it is possible to get out of the skidding state.

Figure 3:
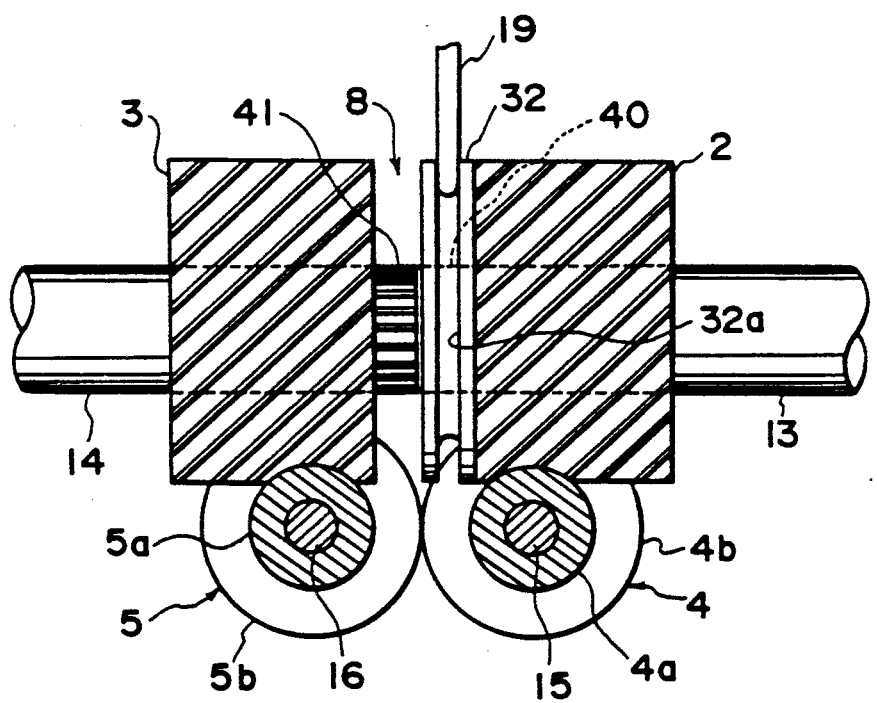
FIG. 3 is a construction view showing a major part of another embodiment of the differential gear mechanism according to the present invention.

In an embodiment of FIG. 3, gear wheels 40 and 41 are formed on the axle shafts 13 and 14. The axle shafts 13 and 14 pierce the worm gears 2 and 3, and have protrusions, which are opposed to each other, between the worm gears 2 and 3. The gear wheels 40 and 41 are each formed at the protrusions of axle shafts 13 and 14. By this construction, splines of the axle shafts 13 and 14 can be used as the gear wheels 40 and 41. Other configurations and operations are as described in the preceding embodiment.

As described above in detail, the present invention makes it possible to connect one worm gear and the other worm gear by clutch means. It is therefore possible to transmit drive torque to the other axle shaft even when one axle shaft enters a skidding state, and thus it is possible to get out of the skidding state unaided.

From the foregoing it will now be apparent that a new and improved differential gear mechanism has been found. It should be understood, of course, that the embodiments disclosed are merely illustrative and are not intended to limit the scope of the invention. Reference should be made to the appended claims, therefore, rather than the specification, to determine the scope of the invention.

What is claimed is:

1. A differential gear mechanism comprising:
   a differential case rotatably driven from outside thereof;
   a pair of worm gears provided in said differential case, each of the worm gears being connected to different axle shafts, said worm gears being arranged coaxially and being rotatable independently;
   a plurality of element gears, each of said element gears comprising a worm wheel and at least oen spur gear, the at least one spur gear being non-rotatably mounted on each respective end of the worm wheel, said element gears being arranged in at least one pair such that the worm wheel of one element gear of the at least one pair meshes with one worm gear, while the worm wheel of the other element gear of said at least one pair meshes with the other worm gear, the at least one spur gear of one element gear of the at least one pair meshes with the at least one spur gear of the other element gear of the at least one pair, each of the said at least one pair of element gears being arranged tangentially to the periphery of its respective worm gear and being rotatably mounted on the differential case; and
   clutch means provided between said worm gears for connecting and disconnecting said worm gears with one another, the clutch means comprises:
   first and second gear wheels provided between said worm gears coaxially therewith, said first gear wheel being provided at one of said worm gears and being rotatable therewith, said second gear wheel being provided at the other of said worm gears and being rotatable therewith, and a movable clutch ring provided between said worm gears, said clutch ring being movable in an axial direction of the worm gears and being engaged with at least one of the gear wheels, said clutch ring being movable between a connected state and a disconnected state, the clutch ring in the connected state operatively connects both the first and second gear wheels and the clutch ring in the disconnected state engages only one of the first and second gear wheels whereby the gear wheels are selectively connected and disconnected with one another.

2. The differential gear mechanism as claimed in calim 1, wherein the differential gear mechanism further includes:

operation means for operating said clutch ring from outside of said differential case to move the clutch ring between the connected state and the disconnected state.

3. The differential gear mechanism as claimed in claim 2, wherein said operation means includes;

at least one lever member extending through said differential case, the at least one lever member being movable in the axial direction of said worm gears, said at least oen lever member being fitted with one end portion in a first ring groove formed in an outside circumferential face of said clutch ring, the at least one member being slidable in the first ring groove to allow slippage between the at least one lever and the clutch ring, and the other end portion of the at least one lever member protruding from an outside circumferential face of said differential case; and a ring member provided on he outside circumferential face of said differential case, the ring member being movable in the axial direction of said worm gears and being rotatably fixed with respect to said differential case, said ring member having a second ring groove in an inside circumferential face thereof, and the other end portion of said at least two lever member being slidably fitted in the second groove of said ring member to allow slippage between the at least one lever and the ring member.

4. The differential gear mechanism as claimed in laim 1, wherein:

said axle shafts extend through said worm gears to form protrusions, the protrusions of the axle shafts being opposed to each other between said worm gears; and said clutch means further includes the first and second gear wheels being formed at the protrusions of said axle shafts.

5. The differential gear mechanism as claimed in calim 4, wherein the differential gear mechanism further includes operation means for operating said clutch ring from outside of said differential case to move the clutch ring between the connected state and the disconnected state.

6. The differential gear mechanism as claimed in claim 5, wherein said operation means includes;

at least one lever member extending through said differential case, the at least one member being movable in the axial direction of said worm gears, said at least one lever member being fitted with one end portion in a first ring groove formed in an outside circumferential face of said clutch ring, the at least one lever member being slidable in the first ring groove to allow slippage between the at least one lever and the clutch ring, and the other end portion of the at least one lever member protruding from an outside circumferential face of said differential case, said ring member having a second ring groove in an inside circumferential face thereof, and the other end portion of said at least one lever member being slidably fitted in the second groove of the ring member to allow slippage between the at least one lever and the ring member.

* * * * *